United States Patent
Kuriyama et al.

[11] Patent Number: 5,925,473
[45] Date of Patent: Jul. 20, 1999

[54] RADIATION IMAGE STORAGE PANEL

[75] Inventors: Haruyoshi Kuriyama; Hideki Suzuki; Shinichiro Fukui, all of Kanagawa, Japan

[73] Assignee: Fuji Photo Film Co., Ltd., Kanagawa, Japan

[21] Appl. No.: 09/050,953

[22] Filed: Mar. 31, 1998

Related U.S. Application Data

[63] Continuation-in-part of application No. 08/893,234, Jul. 15, 1997, abandoned.

[30] Foreign Application Priority Data

Jul. 15, 1996 [JP] Japan .................................. 8-204247
Mar. 31, 1997 [JP] Japan .................................. 9-098081

[51] Int. Cl.⁶ .............................. B32B 9/00; B32B 19/00
[52] U.S. Cl. .................. 428/690; 428/691; 250/483.1; 250/484.1; 250/485.1
[58] Field of Search ............................. 428/690, 691; 250/483.1, 484.1, 485.1

[56] References Cited

U.S. PATENT DOCUMENTS 5,227,253   7/1993   Takasu et al. ............................ 428/690

*Primary Examiner*—Charles Nold
*Attorney, Agent, or Firm*—Birch, Stewart, Kolasch & Birch

[57] ABSTRACT

A radiation image storage panel having a stimulable phosphor layer and a protective film composed of a plastic material film and a coated layer of a fluororesin-containing resin composition containing light-scattering fine particles gives a radiographic image of improved quality.

11 Claims, 1 Drawing Sheet

FIGURE
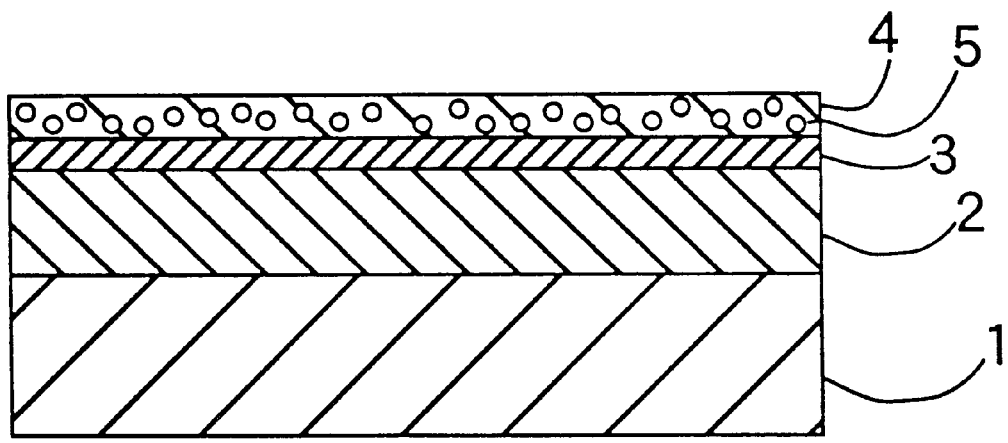

RADIATION IMAGE STORAGE PANEL

CROSS-REFERENCE TO RELATED APPLICATION

This is a Continuation-In-Part application of U.S. patent application Ser. No. 08/893,234 filed Jul. 15, 1997, now abandoned.

FIELD OF THE INVENTION

The present invention relates to a radiation image storage panel using a stimulable phosphor.

BACKGROUND OF THE INVENTION

A radiation image recording and reproducing method utilizing a stimulable phosphor described, for instance, in U.S. Pat. No. 4,239,968, is now practically employed. In the method, a radiation image storage panel comprising a stimulable phosphor (i.e., stimulable phosphor sheet) is employed, and the method comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with a conventional radiography using a combination of a radiographic film and radiographic intensifying screen. Further, the radiation image recording and reproducing method using a stimulable phosphor is of great value especially when the method is employed for medical diagnosis.

The radiation image storage panel employed in the above-described method comprises a stimulable phosphor layer which may be provided on a support. The stimulable phosphor layer generally comprises a binder and a stimulable phosphor (in the form of particles). The stimulable phosphor emits light (that is, gives stimulated emission) when it is excited with stimulating rays after it is exposed to radiation such as X-rays.

The stimulable phosphor layer generally comprises stimulable phosphor particles and a binder. Stimulable phosphor layers of other types are also known. For instance, a stimulable phosphor layer comprising agglomerated stimulable phosphor particles and no binder can be prepared by a sintering method or a vacuum deposition method. The agglomerated stimulable phosphor layer can contain a polymer, if desired. Any of radiation image storage panels having these stimulable phosphor layers can be employed in the above-described radiation image recording and reproducing method.

Further, a transparent film of polymer material is generally placed on the free surface (surface not facing the support) of the phosphor layer to keep the phosphor layer from chemical deterioration or physical shock. The protective film can be arranged, for instance, by coating a solution of a transparent organic polymer such as a cellulose derivative or polymethyl methacrylate on the phosphor layer, or by fixing a beforehand prepared polymer film such as a polyethylene terephthalate film on the phosphor layer with an adhesive. The coated protective layer can be readily prepared by coating a solution of polymer material on the phosphor layer, and the coated protective layer is firmly fixed on the phosphor layer.

In the radiation image recording and reproducing method, the radiation image storage panel is repeatedly employed in the steps of radiation of X-rays (for recording of radiation image), irradiation of stimulating rays (for reading out of the recorded radiation image), and exposure to erasing light (for erasure of residual radiation image). Between these steps, the storage panel is transferred by conveyors such as belts and rollers in the apparatus for performing the radiation image recording and reproducing method. When these steps are repeated, the coated protective layer of the storage panel is apt to be stained or to receive abrasions or scratches on its surface. The stains, abrasions, and/or scratches produced on the surface of the protective layer cause deterioration of image quality of a reproduced radiation image. The radiation image storage panel naturally is desired to give a reproduced radiation image of high quality (such as high sharpness and improved graininess). Therefore, production of stains, abrasions and scratches on the surface of the protective layer should be avoided.

Japanese Patent Provisional Publication No. 2(1990)-193100 (corresponding to U.S. patent application Ser. No. 08/469,761) describes a protective film of a fluororesin which is soluble in an organic solvent and is coated on a stimulable phosphor layer of a radiation image storage panel. The protective film of a fluororesin can effectively reduce the production of stains, abrasions and scratches.

U.S. Pat. No. 5,227,253 discloses a radiation image storage panel having a protective film which is produced from a mixture of a film-forming resin (such as a fluororesin) and an oligomer having a polysiloxane skeleton or a perfluoroalkyl group. The protective film of a mixture of the fluororesin and others can more effectively reduce the production of stain, abrasions and scratches.

U.S. patent application Ser. No. 08/582,502 describes a radiation image storage panel comprising a stimulable phosphor layer and a protective film placed thereon, wherein the protective film comprises a film of plastic material and a layer of a fluororesin-containing resin composition coated thereon, the coated layer having been prepared by coating on the film of plastic material a solution of a resin composition containing not less than 30 wt. % of a fluororesin and drying thus coated solution layer. This radiation images storage panel is described to have not only favorable anti-staining, anti-abrasion and anti-scratch properties but also sufficient physical strength to keep the protective film from production of cracks therein.

SUMMARY OF THE INVENTION

It has been found that although the above-mentioned protective film comprising a film of plastic material and a layer of a fluororesin-containing resin composition coated thereon is excellent in the physical and chemical properties, particularly, in the anti-straining, anti-abrasion and anti-scratch properties and mechanical strength, it sometimes gives a reproduced radiation image having uneven optical density or locally or partially blurred area. Such unevenness or blur on the reproduced radiation image is disadvantageous, particularly, when the reproduced radiation image is to be employed for clinical examination.

Accordingly, it is an object of the invention to provide a radiation image storage panel which not only has the favorable anti-staining, anti-abrasion and anti-scratch properties and sufficient physical strength, but also give a radiation image having good quality free from unevenness and blur.

The present invention resides in a radiation image storage panel comprising a stimulable phosphor layer and a protective film placed thereon, wherein the protective film comprises a film of plastic material and a layer coated thereon which comprises a fluororesin-containing resin composition and light-scattering fine particles.

The light-scattering fine particles are preferably contained in the layer in an amount of 1 to 30 weight %, more preferably 5 to 20 weight %, specifically preferably 10 to 30 weight %.

In the present invention, the term of "fluororesin" is used to include a fluorine-containing olefin polymer (i.e., fluoroolefin polymer) and a copolymer comprising a fluorine-containing olefin monomer and a copolymerizable monomer). The layer comprising the fluororesin-containing resin composition can be crosslinked.

BRIEF DESCRIPTION OF THE DRAWINGS

Figure shows a schematic section of a representative radiation image storage panel of the invention.

DETAILED DESCRIPTION OF THE INVENTION

One representative structure of the radiation image storage panel of the invention is illustrated in Figure, which comprises a support sheet 1, a stimulable phosphor layer 2, a protective film 3, and a coated resin composition layer 4 containing therein light-scattering particles 5.

Details of the radiation image storage panel of the invention are described below.

The stimulable phosphor gives a stimulated emission when it is irradiated with stimulating rays after it is exposed to radiation. In the preferred radiation image storage panel, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include divalent europium activated alkaline earth metal halide phosphors and a cerium activated alkaline earth metal halide phosphors. Both stimulable phosphors favorably give the stimulated emission of high luminance. However, the stimulable phosphors employable in the radiation image storage panel of the invention are not limited to the above-mentioned preferred stimulable phosphors.

The stimulable phosphor layer can be prepared using no binder polymer. For instance, the stimulable phosphor layer can be formed of aggregated phosphor particles which may be impregnated with an organic polymer. Otherwise, the stimulable phosphor layer can be formed on a support by vacuum deposition.

The following shows a process for preparing a stimulable phosphor layer comprising stimulable phosphor particles and a binder polymer.

The stimulable phosphor particles and the binder polymer are well mixed in an appropriate solvent to give a coating dispersion in which the phosphor particles are uniformly dispersed in the binder solution. Examples of the binder polymers include natural polymer materials such as proteins (e.g., gelatin), polysaccharides (e.g., dextran), and gum arabic, and synthetic polymer materials such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol and linear polyester. These binder polymers can be used singly or in combination.

In the coating dispersion, the binder polymer and the stimulable phosphor are introduced generally at a ratio of 1:1 to 1:100 (binder:phosphor, by weight), preferably 1:8 to 1:40 (by weight). The ratio can be varied depending on the desired characteristics of the storage panel and natures of the binder polymers and phosphors.

The coating dispersion of the phosphor and binder polymer in the solvent is then coated uniformly on a support sheet to form a coated layer on the support. The coating can be performed by known coating means such as doctor blade, roll coater, and knife coater.

The support can be optionally selected from the known materials employed for the conventional radiation image storage panel. Examples of the known materials include films of plastic materials such as cellulose acetate, polyester (e.g., polyethylene phthalate), polyamide, polyimide, cellulose triacetate, and polycarbonate.

Some of the known radiation image storage panels have various auxiliary layers: for instance, an adhesive layer which is formed of a polymer material such as gelatin or an acrylic resin on the support and which enhances strength between the support and the phosphor layer or increases sensitivity or image quality (e.g., sharpness and graininess) of the obtainable radiation image; a light-reflecting layer of a light reflecting material such as titanium dioxide; and a light-absorbing layer of a light-absorbing material such as carbon black. The radiation image storage panel of the invention may have one or more of such auxiliary layers.

Further, the support of the radiation image storage panel of the invention may have a great number of a very small convexes or concaves on its surface. If the support is coated with one or more auxiliary layers, the convexes or concaves may be formed on these layers. The great number of very small convexes or concaves can improve sharpness of the radiation image reproduced by the use of the storage panel.

The coated phosphor layer is then dried to give the desired stimulable phosphor layer. The stimulable phosphor layer generally has a thickness of 20 $\mu$m to 1 mm, preferably 50 to 500 $\mu$m. The thickness of the phosphor layer may be varied depending on the characteristics of the radiation image storage panel to be prepared, the natures of the phosphor, and the ratio of the binder polymer to the phosphor.

The coating dispersion of the phosphor layer can be once coated on a sheet other than the support. For instance, the coating dispersion can be coated on a glass sheet, a metal sheet, a plastic sheet or a sheet of other material, that is, a temporary support. The coated phosphor dispersion is then dried to give a phosphor layer and separated from the sheet. The dried phosphor layer (i.e., phosphor sheet) can be used per se with no support or fixed on the genuine support under pressure, optionally using an adhesive.

On the phosphor layer, a protective film is provided, directly, or via a cushioning layer. The protective film of the invention comprises a film of plastic material and a coated layer comprising light-scattering particles and a resin composition containing a fluororesin.

The film of plastic material is optionally selected from those known as protective films of the radiation image storage panels, for instance, films of polyethylene terephthalate, polyethylene naphthalate, and aramide resin.

Other plastic materials also can be employed, provided that the plastic materials have enough strength and high transparency. The thickness of the film of plastic material generally ranges from 1 to 10 μm.

The protective film of the invention is produced by simultaneously coating the fluororesin-containing resin composition and the light-scattering particles on the film of plastic film. The coating of the composition of the light-scattering particles and the fluororesin-containing resin composition on the film of plastic film can be done after the film is placed and fixed on the phosphor layer by an adhesive layer. Otherwise, the coating composition can be coated over the film of plastic material which is placed on a plane surface of an appropriate temporary support such as glass sheet. The film of plastic material which is coated with the coating composition is then placed and fixed on the beforehand prepared phosphor layer using adhesive.

The coating composition is coated on the film of plastic material by preparing a solution of a resin composition preferably containing not less than 30 weight % of a fluororesin, incorporating the light-scattering particles into the solution to give a coating dispersion, coating the dispersion on the film, and drying thus coated dispersion layer.

The fluororesin can be a homopolymer of a fluorine atom-containing olefin or a copolymer of a fluorine atom-containing olefin and other monomer. Examples of the fluororesins include polytetrafluoroethylene, polychlorotrifluoroethylene, polyfluorinated vinyl polymer, polyfluorinated vinylidene polymer, tetrafluoroethylene-hexafluoropropylene copolymer, and fluoroolefin-vinyl ether copolymer. Most of the fluororesins are insoluble in organic solvents. However, copolymers of the fluoroolefin and a copolymerizable monomer can be made soluble in a certain organic solvent, if an appropriate copolymerizable monomer is chosen. Therefore, such soluble fluororesins can be dissolved in an appropriate organic solvent to prepare a resin solution. Further, if an appropriate fluorine atom-containing organic solvent such as a perfluoro solvent is chosen, polytetrafluoroethylene and its modified polymer can be soluble in the solvent.

The above-mentioned fluororesins is employed in combination with other fluororesins or polymers other than the fluororesins. If the coated layer should have high anti-staining properties, the resin composition should contain the fluororesin at least 30 weight %, preferably at least 50 weight %, more preferably not less than 70 weight %.

The fluororesin-containing resin mixture is preferably crosslinked in the coated layer to increase strength and durability of the protective layer. Accordingly, the resin solution can further contain a crosslinking agent such as an isocyanate resin and an amino resin (e.g., melamine resin). An anti-yellowing agent can be also incorporated into the coating solution.

An example of the oligomer having polysiloxane skeleton is an oligomer which has dimthylpolysiloxane skeleton and moreover preferably has at least one functional group such as hydroxyl group. The molecular weight (weight average) of the oligomer preferably ranges from 500 to 100,000, more preferably ranges from 1,000 to 100,000 and most preferably ranges from 3,000 to 10,000.

The oligomer having a perfluoroalkyl group (e.g., tetrafluoroethylene group) preferably has at least one functional group such as hydroxyl group. The molecular weight (weight average) preferably ranges 500 to 100,000, more preferably 1,000 to 100,000, and most preferably ranges from 10,000 to 100,000.

If the oligomer having the functional group is used, cross-linking reaction takes place between the oligomer and the fluororesin in the presence of the aforementioned cross-linking agent in the course of the formation of the resin composition layer. By the cross-linking reaction, the oligomer is incorporated into the molecular structure of the fluororesin. Therefore, the oligomer hardly liberates from the cross-linked resin composition layer even in the course of repeated use of the radiation image storage panel or when the surface of the resin composition layer is subjected to cleaning procedure, and effect of the addition of the oligomer into the resin composition layer is kept for a long time of period. For this reason, the use of an oligomer having a functional group such as —OH group is advantageous.

The oligomer is preferably incorporated into the resin composition in an amount of 0.01 to 10 weight %. Most preferred range is 0.1 to 3 weight %.

The resin composition can further contain a particulate resin of perfluoroolefin or silicone. The particulate resin of perfluoroolefin or silicone preferably has a mean particle size of 0.1 to 10 μm. Most preferred range of the mean particle size is 0.3 to 5 μm. The particulate resin is preferably contained in the resin composition in an amount of 0.5 to 30 weight % per the total weight of the resin composition. Most preferred range is 2 to 20 weight %, particularly 5 to 15 weight %.

The light-scattering fine particles to be incorporated into the fluororesin-containing resin composition layer are now described.

The light-scattering fine particles preferably have a mean particle size smaller than the thickness of the fluororesin-containing resin composition layer. For instance, the light-scattering fine particles preferably have a mean particle size of 0.05 to 5 μm, more preferably 0.1 to 1.0 μm. Further, the light-scattering fine particles preferably have a refractive index higher than that of the fluororesin-containing resin composition so as to impart to the coated layer a satisfactorily high light-scattering property. The amount of the light-scattering fine particles in the coated layer preferably is in the range of 1 to 30 weight %, more preferably 5 to 20 weight %, most preferably 10 to 20 weight %, which can be determined from the viewpoint of balance between the preferred light-scattering effect by the incorporation of the light-scattering fine particles and the resulting decrease of the mechanical strength of the coated layer as well as the decrease of the uniformity of the coated layer.

As the light-scattering fine particles, organic or inorganic fine particles are employed, so long as these fine particles have a refractive index higher than that of the fluororesin-containing resin composition. The light-scattering fine particles preferably have a mean particle size in the range of approximately 0.1 to 0.5 μm. Preferred are fine particles of benzoguanamine resin, fine particles of melamine-formaldehyde resin, and fine particles of titanium dioxide.

The light-scattering particles are preferably dispersed in the coated fluororesin-containing resin layer uniformly. Therefore, if necessary, the light-scattering fine particles can be treated on these surfaces to increase dispersability of the particles in the resin composition. Otherwise, a dispersing agent (i.e., dispersant) can be incorporated into the resin composition solution. Examples of the dispersants include a surface active dispersant such as a cationic dispersant, an anionic dispersant, a nonionic dispersant or a betaine dispersant, and a coupling agent such as a silane coupling agent, a titanate coupling agent or an aluminum coupling agent. Preferred are such coupling agents as a titanate coupling agent and an aluminum coupling agent. The coupling agent is preferably incorporated into the resin composition in an amount of 0.2 to 10 weight %, more preferably 0.5 to 5.0 weight %, based on the amount of the light-scattering fine particles.

The light-scattering property can be increased by rendering the fluororesin-containing resin composition layer rough by the known methods. However, the treatment for increasing surface roughness is apt to decrease anti-staining property of the coated layer. In more detail, the surface of the fluororesin-containing layer which is highly resistant to staining or adhesion of stain and from which the attached stain can be easily removed is rendered to show poor anti-staining property and poor stain-cleaning property when its surface is made rough. Therefore, a simple surface roughness treatment is not favorable for imparting to the fluororesin-containing resin layer the satisfactory light-scattering property without decreasing its various advantageous physical and chemical properties.

The layer comprising the fluororesin-containing resin composition and the light-scattering particles preferably has a thickness less than that of the film of plastic material on which it is coated preferably has a thickness in the range of 0.5 to 10 μm.

The radiation image storage panel of the invention can be prepared by the above-described process. However, the radiation image storage panel can be modified in the known manners. For instance, one or more layers of constituting the radiation image storage panel can be so colored as to well absorb the stimulating rays and not to absorb the stimulated emission. Such coloring sometimes is effective to increase sharpness of the image obtained by the use of the storage panel. Otherwise, an independent colored layer can be placed in an appropriate position of the storage panel for the same purpose.

Examples embodying the present invention are given below.

EXAMPLES 1 to 3

[Preparation of Stimulable Phosphor Layer]

Composition

| | |
|---|---|
| Stimulable phosphor (BaFBr$_{0.9}$I$_{0.1}$: Eu$^{2+}$) | 200 g |
| Binder: Polyurethane elastomer (Pandex T-5265H (solid), product of Dai-Nippon Ink Chemical Industries Co., Ltd.) | 8.0 g |
| Anti-yellowing agent: Epoxy resin (Epikote 1001 (solid), product of Yuka Shell Epoxy Co., Ltd.) | 2.0 g |

The composition was placed in methyl ethyl ketone and dispersed by means of a propeller mixer to give a coating dispersion of a viscosity in the range of 25 to 30 PS (at 25° C.) in which the ratio of binder to phosphor was 1/20. The coating dispersion was coated on a polyethylene terephthalate temporary support having silicone release coating. The coated layer was dried at 100° C. for 15 minutes to give a stimulable phosphor sheet having a thickness of 300 μm. Thus obtained phosphor sheet was placed on a polyethylene terephthalate film (PET film, thickness: 300 μm) on its undercoating layer side. The resulting laminate was passed through heating rollers heated to 60–70° C. under pressure (45 kgf/20 cm), to give a stimulable phosphor layer (thickness: 200 μm) on the PET film.

[Provision of Protective Film]

On the stimulable phosphor layer was placed a transparent polyethylene terephthalate film (PET film, thickness: 9 μm, having a polyester adhesive layer thereon) to face the adhesive layer to the phosphor layer. The resulting laminate was passed through heating rollers to heat 90 to 100° C. under pressure, to fix the PET film on the stimulable phosphor layer.

[Coating of Mixture of Fluororesin-Containing Resin Composition and Light-Scattering Fine Particles]

Composition

| | |
|---|---|
| Fluororesin: Fluoroolefin-vinyl ether copolymer (Lumiflon LF-100 (50 wt. % xylene solution), product of Asahi Glass Co., Ltd.) | 50 g |
| Cross-linking agent: Isocyanate resin (Colonate HX (solid content: 100 wt. %), product of Nippon Polyurethane Industries Co., Ltd.) | 5 g |
| Alcohol modified-silicone (having a hydroxyl group (carbinol group) at both ends, X-22-2809 (solid content: 66 wt. %), product of Shin-Etsu Chemical Industries Co., Ltd.) | 0.5 g |
| Benzoguanamine resin particles (Epostar S, available from Japan Catalyst Co., Ltd., mean particle size: 0.3 μm) | indicated in Table 1 |

The fluororesin, cross-linking agent and alcohol-modified silicone were placed in methyl ethyl ketone and dissolved to give a resin solution of a viscosity in the range of 0.1 to 0.3 PS (at 25° C.). To the resin solution were added the benzoguanamine resin particles in the amount indicated in Table 1 (in which values are given in terms of relative values to the amount of the fluororesin) to give a coating dispersion. The coating dispersion was coated on the PET film fixed on the phosphor layer using a doctor blade. The coated layer was heated to 120° C. for 20 minutes for performing cross-linking reaction to give a layer comprising a fluororesin-containing resin composition and the light-scattering particles (thickness: approx. 1.5 μm).

The fluororesin-containing resin composition comprising the fluororesin, cross-linking agent and alcohol-modified silicone had a refractive index of 1.45, while the benzoguanamine resin particles had a refractive index of 1.57.

Thus, a radiation image storage panel of the invention comprising a support, a undercoating layer, a stimulable phosphor layer, a polyethylene terephthalate film, and a layer comprising the fluororesin-containing composition and the light-scattering particles was prepared.

EXAMPLES 4 to 6

The procedures of Examples 1 to 3 were repeated except that the light-scattering fine particles (benzoguanamine resin particles) were replaced with titanium dioxide particles (mean particle size: 0.15 μm, refractive index: 2.5, available from Ishihara Sangyo Co., Ltd.) in the amount set forth in Table 1, to give radiation image storage panels. In the preparation of the titanium dioxide particle-containing coating dispersion, a titanate-type coupling agent (Plainact KR-138S, available from Ajinomoto Co., Ltd.) was employed for well dispersing the titanium dioxide particles in the solution of the fluororesin-containing composition.

EXAMPLES 7 to 9

The procedures of Examples 1 to 3 were repeated except that the isocyanate resin of Colonate HX (crosslinking agent) was replaced with an isocyanate resin of Sumijoule N3500 (available from Sumitomo Bayer Urethane Co., Ltd., 4.6 g) and that the Benzoguanamine resin particles are replaced with melamine-formaldehyde condensation resin particles (mean particle size: 0.6 μm, Epostar S6, available from Nihon Catalyst Co., Ltd., refractive index: 1.57) in an amount indicated in Table 1, to give radiation image storage panels. In the preparation of the melamine-formaldehyde condensation resin particle-containing coating dispersion, a titanate-type coupling agent (Plainact AL-M, available from Ajinomoto Co., Ltd.) was employed for well dispersing the melamine-formaldehyde condensation resin particles in the solution of the fluororesin-containing composition.

Comparison Example 1

The procedures of Examples 1 to 3 were repeated except that no light-scattering fine particles were employed for the preparation of the coating dispersion to be coated on the protective film, to give a radiation image storage panel.

Evaluation of Radiation Image Storage Panel

1) Sensitivity

X rays (tube voltage: 80 KVp) were applied on a radiation image storage panel, and the storage panel was then scanned with He-Ne laser beam (wavelength: 632.8 mm) to stimulate the phosphor particles in the storage panel. The amount of the produced emission was measured and converted into a relative value.

2) Sharpness of Image

X rays (tube voltage: 80 KVp) were applied onto a radiation image storage panel through an MTF chart, and the storage panel was scanned with He-Ne laser beam (wavelength: 632.8 nm) to stimulate the phosphor particles in the storage panel. The light emission produced by the stimulated phosphor particles was collected by a photomultiplier (sensitivity: S-5). The collected light emission was converted into electric signals and reproduced on a radiation image display in the form of a reproduced MTF chart image. Then, the modulated transfer function (MTF) was determined and expressed in terms of the spacial frequency of 2 cycles/mm.

3) Interference Unevenness

The surface of the radiation image storage panel was visually examined and judged according to the following criterion:

AA: No interference unevenness is seen.

BB: Insignificant interference unevenness is seen.

CC: Conspicuous interference unevenness is seen.

4) Image Quality

A radiation image for clinical examination was obtained utilizing the radiation image storage panel. The quality of the obtained radiation image was visually examined and judged according to the following criterion:

AA: No unevenness concerning optical density is seen in the radiation image.

BB: A slight unevenness concerning optical density which does not disturb clinical examination is seen.

CC: Conspicuous unevenness concerning optical density which disturbs clinical examination is seen.

The results obtained in the above-mentioned various evaluations are set forth in Table 1.

TABLE 1

|        | Amount of Particles | Relative Sensitivity | Sharpness | Interference Unevenness | Image Quality |
|--------|---------|------|-------|----|----|
| Ex. 1  | 6.0%    | 97   | 35.9% | BB | BB |
| Ex. 2  | 18.0%   | 97   | 35.7% | AA | AA |
| Ex. 3  | 24.0%   | 96   | 36.4% | AA | AA |
| Ex. 4  | 6.0%    | 100  | 37.0% | BB | BB |
| Ex. 5  | 12.0%   | 100  | 37.8% | BB | BB |
| Ex. 6  | 16.0%   | 99   | 37.5% | AA | AA |
| Ex. 7  | 6.0%    | 98   | 36.0% | BB | BB |
| Ex. 8  | 18.0%   | 97   | 36.4% | AA | AA |
| Ex. 9  | 24.0%   | 97   | 36.6% | AA | AA |
| Com. 1 | 0.0%    | 98   | 36.0% | CC | CC |

From the results shown in Table 1, it has been confirmed that the radiation image storage panels of the invention effectively reduce occurrence of unevenness in the image and gives a radiation image of high quality.

What is claimed is:

1. A radiation image storage panel comprising a stimulable phosphor layer and a protective film placed thereon, wherein the protective film comprises a film of plastic material and a layer coated thereon which comprises a fluororesin-containing resin composition and light-scattering fine particles.

2. The radiation image storage panel of claim 1, wherein the light-scattering fine particles are contained in the layer in an amount of 1 to 30 weight %.

3. The radiation image storage panel of claim 1, wherein the light-scattering fine particles have a refractive index higher than that of the fluororesin-containing resin composition.

4. The radiation image storage panel of claim 1, wherein the light-scattering fine particles are particles of organic material.

5. The radiation image storage panel of claim 1, wherein the light-scattering fine particles are particles of inorganic material.

6. The radiation image storage panel of claim 1, wherein the layer comprising a fluororesin-containing resin composition and light-scattering fine particles further comprises a dispersant.

7. The radiation image storage panel of claim 1, wherein the layer comprising a fluororesin-containing resin composition and light-scattering fine particles further comprises an aluminate coupling agent or a titanate coupling agent.

8. The radiation image storage panel of claim 1, wherein the light-scattering fine particles have a mean particle size in the range of 0.05 to 5 μm and larger than the thickness of the layer comprising a fluororesin-containing resin composition and light-scattering fine particles.

9. The radiation image storage panel of claim 1, wherein the thickness of the layer comprising a fluororesin-containing resin composition and light-scattering fine particles is less than that of the film of plastic material.

10. The radiation image storage panel of claim 1, wherein the film of plastic material comprises polyethylene terephthalate or polyethylene naphthalate.

11. The radiation image storage panel of claim 1, wherein the stimulable phosphor layer is placed on a support sheet.

* * * * *